Patented June 7, 1927.

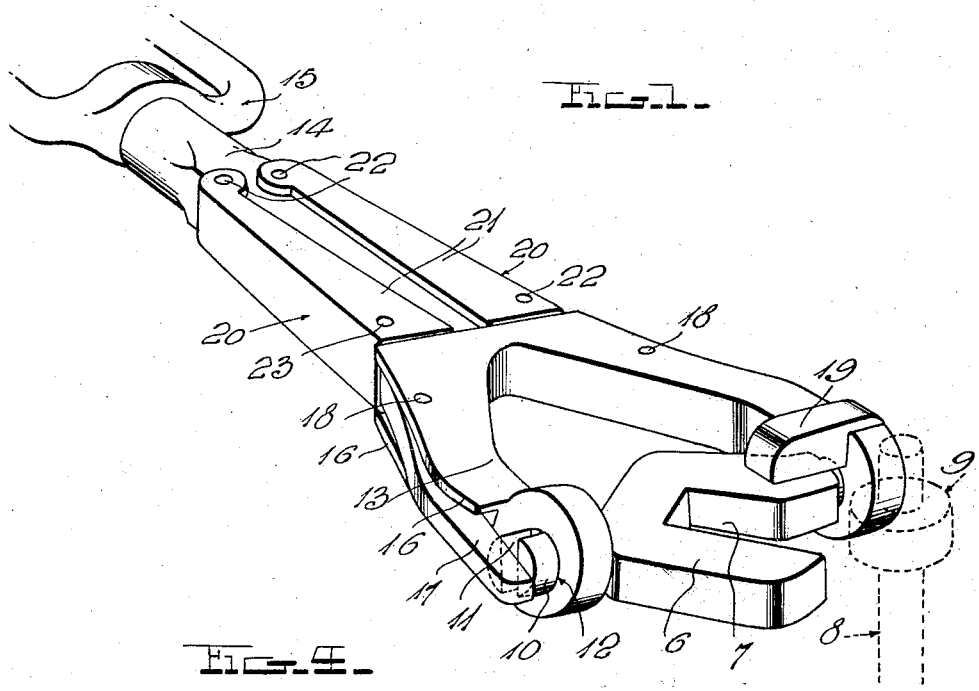
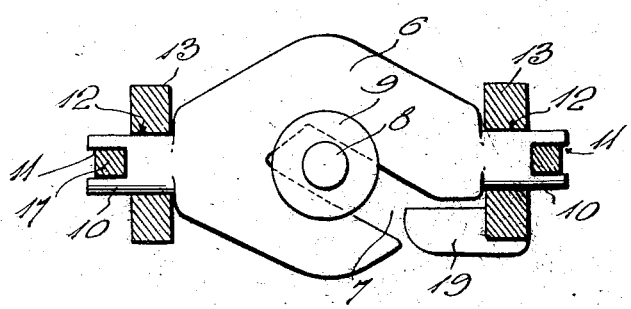
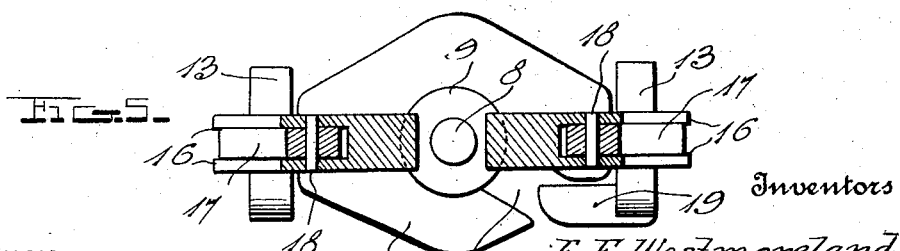

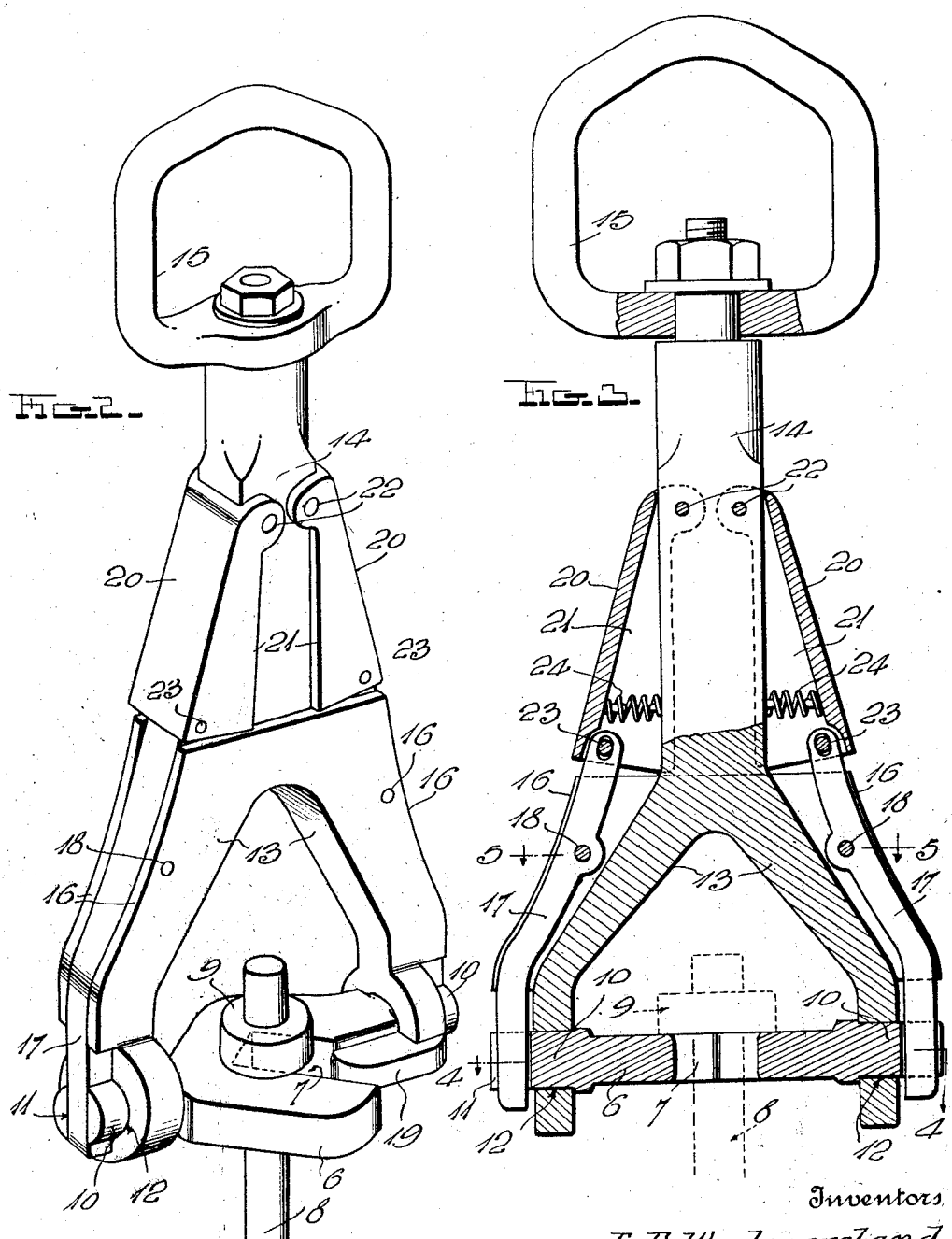

1,631,845

UNITED STATES PATENT OFFICE.

EARL E. WESTMORELAND AND SAMUEL G. TAYLOR, OF OIL CITY, LOUISIANA.

SUCKER-ROD ELEVATOR.

Application filed August 16, 1926. Serial No. 129,540.

The invention relates to improvements in devices for elevating sucker rods from oil and other deep wells, and it aims to provide a device of this character which is rather simple and inexpensive, yet will be highly efficient and will be positively locked against release by accident, novel provision being made however for permitting disconnection of the elevator from the rod when desired.

With the foregoing in view, the invention resides in the novel subject matter hereinafter described and claimed, the description being supplemented by the accompanying drawings.

Figure 1 is a perspective view illustrating the manner of engaging the device with or disengaging it from a sucker rod.

Fig. 2 is a perspective view showing the elevator operatively connected with the sucker rod.

Fig. 3 is a vertical sectional view partly in elevation.

Figs. 4 and 5 are horizontal sectional views on the correspondingly numbered lines of Fig. 3.

In the drawing above briefly described, the numeral 6 designates a collar having a throat 7 to receive a sucker rod 8, the latter being provided with any desired collar or the like 9 to rest upon said collar 6. This collar 6 is provided with horizontally alined trunnions 10 whose outer ends are provided with notches 11 for a purpose to appear. These trunnions are turnably received in bearing openings 12 in the lower ends of a pair of arms 13, these arms being integral with and projecting downwardly from a vertical shank 14, the upper end of this shank being provided with any desired swivel or the like 15, for connecting a hoisting cable thereto.

The arms 13 are provided at their outer, opposed sides, with integral vertical flanges 16 which extend from the upper ends of said arms to points near their lower ends. Two vertically disposed latch levers 17 are positioned between these flanges, and fulcrums 18 pass through the intermediate portions of said levers and through said flanges. The lower ends of these levers 17 are normally received in the notches 11 to hold the shank 14 and the arms 13 against downward swinging with respect to the collar 6, but when said levers are released from said notches, said shank and arms may downwardly swing to the position of Fig. 1, thus permitting engagement of the collar 6 with the sucker rod 8, or disengagement from said rod. When the shank and arms are vertically disposed, a guard finger 19 which is integral with one of the arms 13, closes the throat 7 so that the rod 8 cannot accidentally move therefrom. When the shank and arms are downwardly swung as in Fig. 1 however, this finger clears the throat 7, as clearly seen in this view.

Two upwardly converging handles 20 are provided with parallel side flanges 21 which straddle the shank 14 and at their upper ends are pivoted to the latter as indicated at 22. The upper ends of the levers 17 are received between the lower ends of the flanges 21 and are pivotally connected therewith as indicated at 23, and it will be observed that the connected ends of said levers and the handles 20, are normally spaced outwardly from the shank 14 (see Fig. 3). Then, the lower ends of the levers 17 are seated within the notches 11 so that relative turning of the collar 6 and shank 14, is prevented. When it is desired however to downwardly swing the shank to the position of Fig. 1, the two handles 20 are jointly gripped in one hand and forced inwardly toward the shank 14, thus inwardly moving the upper ends of the levers 17 and outwardly moving their lower ends out of the aforesaid notches.

In the present showing, for normally holding the levers 17 in operative position, two coiled compression springs 24 are interposed between the shank 14 and the handles 20, said springs being located between the flanges 21 and held in proper relation with the handles and shank, by any desired means.

It will be seen from the foregoing that a new and improved construction and arrangement of parts has been provided and while the details disclosed are preferably followed, it is to be understood that within the scope of the invention as claimed, variations may be made.

We claim:—

1. In a sucker rod elevator, a collar provided with oppositely projecting trunnions, said collar being formed with a rod-receiving throat, a vertical shank having spaced arms at its lower end formed with openings through which said trunnions pass, a guard on one of said arms for closing said throat until said shank is downwardly swung, a substantially vertical latch lever at the outer side of one of said arms and fulcrumed thereto between its ends, one of said trunnions having a notch in its outer end normally receiving the lower end of said lever to hold said shank against downward swinging with respect to the collar, the upper end of said lever being outwardly spaced from the arm on which it is fulcrumed, a lever releasing handle pivoted at its lower end to said upper end of the lever and pivoted at its upper end to said shank, whereby inward forcing of said handle will so swing said lever as to move its lower end out of said notch, and spring means for moving said lever and handle to normally hold the former engaged with the notch.

2. In a sucker rod elevator, a collar provided with oppositely projecting trunnions, said collar being formed with a rod-receiving throat, a vertical shank having spaced arms at its lower end formed with openings through which said trunnions pass, a guard on one of said arms for closing said throat until said shank is downwardly swung, spaced vertical flanges projecting outwardly from one of said arms and extending from its upper end to points near its lower end, a substantially vertical latch lever disposed between and projecting downwardly from said flanges, one of said trunnions having a notch which normally receives the lower end of the lever to hold said shank against downward swinging with respect to said collar, a fulcrum passing through said flanges and the intermediate portion of said lever, a lever releasing handle having parallel vertical flanges whose lower ends straddle and are pivoted to the upper end of said lever, the upper ends of these flanges straddling and being pivoted to said shank, said handle and the upper end of the lever being normally spaced outwardly from the shank, whereby inward forcing of said handle will so swing said lever as to move its lower end out of said notch, and spring means between certain of said flanges for moving said lever and handle to normally hold the former engaged with the notch.

In testimony whereof we have hereunto affixed our signatures.

EARL E. WESTMORELAND.
SAMUEL G. TAYLOR.